United States Patent
Babin et al.

(10) Patent No.: US 7,137,807 B2
(45) Date of Patent: Nov. 21, 2006

(54) HOT RUNNER NOZZLE WITH A TIP, A TIP SURROUNDING PIECE AND AN ALIGNMENT PIECE

(75) Inventors: Denis Babin, Georgetown (CA); Gino Colonico, Georgetown (CA)

(73) Assignee: Mold-Masters Limited, Georgetown (CA)

( * ) Notice: Subject to any disclaimer, the term of this patent is extended or adjusted under 35 U.S.C. 154(b) by 252 days.

(21) Appl. No.: 10/717,623

(22) Filed: Nov. 21, 2003

(65) Prior Publication Data

US 2004/0137107 A1    Jul. 15, 2004

Related U.S. Application Data

(60) Provisional application No. 60/427,926, filed on Nov. 21, 2002.

(51) Int. Cl.
*B29C 45/23* (2006.01)

(52) U.S. Cl. .................................. 425/564; 425/566

(58) Field of Classification Search ............. 425/562, 425/563, 564, 565, 566
See application file for complete search history.

(56) References Cited

U.S. PATENT DOCUMENTS

| 2,865,050 A | 12/1958 | Strauss |
| 3,488,810 A | 1/1970 | Gellert |
| 3,677,682 A | 7/1972 | Putkowski |

(Continued)

FOREIGN PATENT DOCUMENTS

| CA | 2082700 | 5/1994 |

(Continued)

OTHER PUBLICATIONS

Ewikon, HPS IIII-VT Nozzles, 230 V Externally Heated, "For Multi-Cavity Applications and Close Cavity Spacing," pp. 2-7, Oct. 2001.

(Continued)

*Primary Examiner*—Tim Heitbrink
(74) *Attorney, Agent, or Firm*—McDonnell Boehnen Hulbert & Berghoff LLP

(57) ABSTRACT

A nozzle for an injection molding apparatus is provided. The injection molding apparatus includes a manifold and a mold component. The manifold has at least one runner therein that is downstream from a melt source. The mold component defines at least one mold cavity and defining a gate into each mold cavity. The gate defines an axis. The mold component has a mold component alignment surface thereon. The nozzle includes a nozzle body, a tip, a tip surrounding piece and an alignment piece. The nozzle body defines a nozzle body melt passage, which is adapted to be in fluid communication and downstream from the at least one runner. The tip is removably connected to the nozzle body. The tip defines a tip melt passage therethrough. The tip melt passage is downstream from and in fluid communication with the nozzle body melt passage, and is upstream from and in fluid communication with the gate. The tip surrounding piece is removably connected with respect to the nozzle body. The alignment piece is positioned between the tip and the tip surrounding piece. The tip contacts the alignment piece to align the tip with respect to the alignment piece. The alignment piece contacts the tip surrounding piece to align the alignment piece with respect to the tip surrounding piece. The tip surrounding piece is adapted to contact the mold component to align the tip surrounding piece with respect to the gate, so that the tip is aligned with respect to the gate. The contact between the tip, the alignment piece, the tip surrounding piece and the mold component is adapted to be axially proximate the gate.

59 Claims, 7 Drawing Sheets

U.S. PATENT DOCUMENTS

| | | |
|---|---|---|
| 3,716,318 A | 2/1973 | Erik et al. |
| 3,741,704 A | 6/1973 | Beasley |
| 3,952,927 A | 4/1976 | Schaumburg et al. |
| 4,004,871 A | 1/1977 | Hardy |
| 4,010,903 A | 3/1977 | Sakuri et al. |
| 4,013,393 A | 3/1977 | Gellert |
| 4,043,740 A | 8/1977 | Gellert |
| 4,053,271 A | 10/1977 | Gellert |
| 4,173,448 A | 11/1979 | Rees et al. |
| 4,212,627 A | 7/1980 | Gellert |
| 4,268,240 A | 5/1981 | Rees et al. |
| 4,268,241 A | 5/1981 | Rees et al. |
| 4,279,588 A | 7/1981 | Gellert |
| 4,286,941 A | 9/1981 | Gellert |
| 4,306,852 A | 12/1981 | Mateev et al. |
| 4,312,630 A | 1/1982 | Travaglini |
| 4,318,686 A | 3/1982 | Morgan |
| 4,330,258 A | 5/1982 | Gellert |
| 4,368,028 A | 1/1983 | Grish et al. |
| 4,412,807 A | 11/1983 | York |
| 4,450,999 A | 5/1984 | Gellert |
| 4,517,453 A | 5/1985 | Tsutsumi |
| 4,652,230 A | 3/1987 | Osuna-Diaz |
| 4,662,837 A | 5/1987 | Anderson |
| 4,768,283 A | 9/1988 | Gellert |
| 4,768,945 A | 9/1988 | Schmidt et al. |
| 4,771,164 A | 9/1988 | Gellert |
| 4,781,572 A | 11/1988 | Boring |
| 4,787,836 A | 11/1988 | Osuna-Diaz et al. |
| 4,832,593 A | 5/1989 | Brown |
| 4,875,848 A | 10/1989 | Gellert |
| 4,902,218 A | 2/1990 | Leonard et al. |
| 4,911,636 A | 3/1990 | Gellert |
| 4,925,384 A | 5/1990 | Manner |
| 4,945,630 A | 8/1990 | Gellert |
| 4,950,154 A | 8/1990 | Moberg |
| 4,954,072 A | 9/1990 | Zimmerman |
| 4,981,431 A | 1/1991 | Schmidt |
| 5,015,170 A | 5/1991 | Gellert |
| 5,028,227 A | 7/1991 | Gellert et al. |
| 5,030,084 A | 7/1991 | Gellert et al. |
| 5,053,271 A | 10/1991 | Mori et al. |
| 5,067,893 A | 11/1991 | Osuna-Diaz |
| 5,135,377 A | 8/1992 | Gellert |
| 5,139,724 A | 8/1992 | Hofstetter et al. |
| 5,141,696 A | 8/1992 | Osuna-Diaz |
| 5,208,052 A | 5/1993 | Schmidt et al. |
| 5,208,228 A | 5/1993 | Ok et al. |
| 5,238,378 A | 8/1993 | Gellert |
| 5,254,305 A | 10/1993 | Fernandez et al. |
| 5,268,184 A | 12/1993 | Gellert |
| 5,269,677 A | 12/1993 | Gauler |
| 5,299,928 A | 4/1994 | Gellert |
| 5,324,191 A | 6/1994 | Schmidt |
| 5,334,008 A | 8/1994 | Gellert |
| 5,360,333 A | 11/1994 | Schmidt |
| 5,374,182 A | 12/1994 | Gessner |
| 5,421,716 A | 6/1995 | Gellert |
| 5,443,381 A | 8/1995 | Gellert |
| 5,474,439 A | 12/1995 | McGrevy |
| 5,492,467 A | 2/1996 | Hume et al. |
| 5,501,594 A | 3/1996 | Glozer et al. |
| 5,505,613 A | 4/1996 | Krummenacher |
| 5,518,393 A | 5/1996 | Gessner |
| 5,545,028 A | 8/1996 | Hume et al. |
| 5,554,395 A | 9/1996 | Hume et al. |
| 5,569,475 A | 10/1996 | Adas et al. |
| 5,652,003 A | 7/1997 | Gellert |
| 5,658,604 A | 8/1997 | Gellert et al. |
| 5,674,439 A | 10/1997 | Hume et al. |
| 5,686,122 A | 11/1997 | Huntington et al. |
| 5,695,793 A | 12/1997 | Bauer |
| 5,700,499 A | 12/1997 | Bauer |
| 5,707,667 A | 1/1998 | Galt et al. |
| 5,736,171 A | 4/1998 | McGrevy |
| 5,795,599 A | 8/1998 | Gellert |
| 5,804,228 A | 9/1998 | Kofsman et al. |
| 5,811,140 A | 9/1998 | Manner |
| 5,820,899 A | 10/1998 | Gellert et al. |
| 5,834,041 A | 11/1998 | Sekine et al. |
| 5,845,853 A | 12/1998 | Frideman |
| 5,849,343 A | 12/1998 | Gellert et al. |
| 5,871,785 A | 2/1999 | Van Boekel |
| 5,871,786 A | 2/1999 | Hume et al. |
| 5,879,727 A | 3/1999 | Puri |
| 5,885,628 A | 3/1999 | Swenson et al. |
| 5,894,025 A | 4/1999 | Lee et al. |
| 5,895,669 A | 4/1999 | Seres, Jr. et al. |
| 5,925,386 A | 7/1999 | Moberg |
| 5,941,637 A | 8/1999 | Maurer |
| 5,948,450 A | 9/1999 | Swenson et al. |
| 5,955,121 A | 9/1999 | Gellert et al. |
| 5,980,234 A | 11/1999 | Harley |
| 5,980,237 A | 11/1999 | Swenson et al. |
| 5,984,661 A | 11/1999 | Vorkoper |
| 6,003,182 A | 12/1999 | Song |
| 6,009,616 A | 1/2000 | Gellert |
| 6,017,209 A | 1/2000 | Gellert et al. |
| 6,022,210 A | 2/2000 | Gunther |
| 6,030,202 A | 2/2000 | Gellert et al. |
| 6,036,467 A | 3/2000 | Jameson |
| 6,050,806 A | 4/2000 | Ko |
| 6,074,195 A | 6/2000 | Belous |
| 6,089,468 A | 7/2000 | Bouti |
| 6,113,381 A | 9/2000 | Gellert et al. |
| 6,135,757 A | 10/2000 | Jenko |
| 6,143,358 A | 11/2000 | Singh et al. |
| 6,164,954 A | 12/2000 | Mortazavi et al. |
| 6,220,851 B1 | 4/2001 | Jenko |
| 6,227,461 B1 | 5/2001 | Schroeder et al. |
| 6,234,783 B1 | 5/2001 | Shibata et al. |
| 6,245,278 B1 | 6/2001 | Lausenhammer et al. |
| 6,254,377 B1 | 7/2001 | Kazmer et al. |
| 6,261,084 B1 | 7/2001 | Schmidt |
| 6,264,460 B1 | 7/2001 | Wright et al. |
| 6,273,706 B1 | 8/2001 | Gunther |
| 6,287,107 B1 | 9/2001 | Kazmer et al. |
| 6,309,208 B1 | 10/2001 | Kazmer et al. |
| 6,315,549 B1 | 11/2001 | Jenko et al. |
| 6,318,990 B1 | 11/2001 | Gellert et al. |
| 6,331,106 B1 | 12/2001 | Helldin |
| 6,358,038 B1 | 3/2002 | Rozenberg |
| 6,358,039 B1 | 3/2002 | Manner et al. |
| 6,394,785 B1 | 5/2002 | Ciccone |
| 6,419,116 B1 | 7/2002 | Eigler et al. |
| 6,428,305 B1 | 8/2002 | Jenko |
| 6,533,571 B1 | 3/2003 | Fikani |
| 6,609,902 B1 | 8/2003 | Blais et al. |
| 6,709,262 B1 | 3/2004 | Fong |
| 6,726,467 B1 | 4/2004 | Lefebure |
| 6,769,901 B1 | 8/2004 | Babin et al. |
| 6,789,745 B1 | 9/2004 | Babin et al. |
| 6,821,112 B1 | 11/2004 | Eigler et al. |
| 6,832,909 B1 | 12/2004 | Bazzo et al. |
| 6,869,276 B1 | 3/2005 | Babin et al. |
| 6,921,257 B1 | 7/2005 | Olaru |
| 6,921,259 B1 | 7/2005 | Sicilia et al. |
| 6,962,492 B1 | 11/2005 | Olaru |
| 6,971,869 B1 | 12/2005 | Olaru |
| 6,988,883 B1 | 1/2006 | Babin et al. |
| 2003/0008034 A1 | 1/2003 | Niewels |
| 2003/0082263 A1 | 5/2003 | Olaru |
| 2003/0082264 A1 | 5/2003 | Babin et al. |
| 2003/0086997 A1 | 5/2003 | Olaru |

| | | | |
|---|---|---|---|
| 2003/0170340 A1 | 9/2003 | Sicilia et al. |
| 2003/0235638 A1 | 12/2003 | Gellert |
| 2004/0058031 A1 | 3/2004 | Niewels |
| 2004/0071817 A1 | 4/2004 | Fischer et al. |
| 2004/0131721 A1 | 7/2004 | Babin et al. |
| 2004/0137107 A1 | 7/2004 | Babin et al. |
| 2004/0146598 A1 | 7/2004 | Sicilia et al. |
| 2004/0208949 A1 | 10/2004 | Niewels |
| 2004/0258788 A1 | 12/2004 | Olaru |
| 2005/0106283 A1 | 5/2005 | Olaru |
| 2005/0118298 A1 | 6/2005 | Babin et al. |
| 2005/0136151 A1 | 6/2005 | Babin |
| 2005/0214403 A1 | 9/2005 | Olaru |

FOREIGN PATENT DOCUMENTS

| | | |
|---|---|---|
| CA | 2190569 | 5/1998 |
| CA | 2261367 | 8/2000 |
| CA | 2358148 A1 | 3/2003 |
| CA | 2473920 | 8/2003 |
| DE | 3245571 A1 | 6/1984 |
| DE | 29602484 | 5/1996 |
| DE | 19608676 | 1/1997 |
| DE | 100 08 722 A1 | 8/2001 |
| DE | 10037739 A1 | 2/2002 |
| EP | 0 590 677 A1 | 6/1994 |
| EP | 0638407 | 2/1995 |
| EP | 0 743 158 A1 | 11/1996 |
| EP | 0750975 A1 | 1/1997 |
| EP | 0835176 B1 | 4/1998 |
| EP | 0873841 | 10/1998 |
| EP | 0 743 158 B1 | 8/1999 |
| EP | 0920969 A1 | 9/1999 |
| EP | 0962296 A2 | 12/1999 |
| EP | 1188537 A2 | 3/2002 |
| EP | 1 321 274 A1 | 6/2003 |
| FR | 2537497 | 6/1984 |
| GB | 1 540 698 | 2/1979 |
| JP | 05-261770 | 10/1992 |
| JP | 05-177664 | 7/1993 |
| JP | 05-309695 | 11/1993 |
| JP | 06-143358 | 5/1994 |
| JP | 7-148786 | 6/1995 |
| JP | 8-90598 | 4/1996 |
| JP | 09-123222 A | 5/1997 |
| JP | 10 034708 | 2/1998 |
| JP | 10-264222 | 10/1998 |
| JP | 10-296798 | 11/1998 |
| JP | 11-254488 | 9/1999 |
| JP | 2002-273768 | 9/2002 |
| JP | 2002-307492 | 10/2002 |
| JP | 2003-11173 | 1/2003 |
| JP | 2003-11174 | 1/2003 |
| JP | 2003-11176 | 1/2003 |
| JP | 2003-071873 | 3/2003 |
| WO | WO 84/00922 | 3/1984 |
| WO | WO 97/02129 | 1/1997 |
| WO | WO/00/48814 | 8/2000 |
| WO | WO 01/28750 A1 | 10/2000 |
| WO | WO 01/78961 | 10/2001 |
| WO | WO 02/40245 A1 | 5/2002 |
| WO | WO 03/04243 | 1/2003 |
| WO | WO 03/028973 | 4/2003 |
| WO | WO 03/028974 | 4/2003 |
| WO | WO 03/70446 | 8/2003 |
| WO | WO 03/086734 | 10/2003 |
| WO | WO 2004/12923 | 2/2004 |
| WO | WO 2005/090051 A1 | 9/2005 |

OTHER PUBLICATIONS

Ewikon, HPS III Single Tips, 230 V Externally Heated, "HPS III-SE High Performance Single Tips, 230 V With Tip Sealing Technology," pp. 2-9, Mar. 2002.
Ewikon, Product Guide, "Internally Heated Hotrunner Systems," pp. 2-7, Oct. 2000.
Husky Injection Molding Systems, S.A., 750 Series.
PCT Search Report for PCT/CA03/01154 dated Dec. 3, 2004.
Ewikon, HPS III-NV Valve Gate Systems, "All Advantages of the Valve Gate Technology in a Most Compact System," p. 209, Oct. 2001.
Ewikon, Instruction Manual for Ewikon Hotrunner Systems.
Ewikon, Hotrunner Systems for the Packaging and Medical Industry, pp. 2-7, Jun. 2001.
J.D. Robinson, "Gating and Cooling Techniques for Polypropylene," Plastics, Aug. 1965, pp. 47-51.
H.P. Manner, "Nadelverschluβdusen fur kurze Zykluszeit," Kunststoffe 85(2): 166-168(1995).
Ewikon, Hotrunner Systems for Large Parts, pp. 2-11, May 2000.
Ewikon Brochure 2000, AuBenbeheizte HeiBkanalduse, 230 V, fur schnelle Farbwechsel, 3 pgs.
Daniel Frenkler and Henry K. Zawistowski—RAPRA Technology Ltd., "Hot Runners in Injection Moulds," 2001.
Redacted letter and attached figure addressed to Mold Masters Limited from the representative of Mr. Maurizio Bazzo dated Dec. 21, 2001.
Images and information from "Gunther Hot Runner Technology," taken from Gunther website Aug. 2003.
Kona Corporation Catalog entitled "Kona Bushing for Sprueless Molding," pp. 1-24, dated Jun. 25, 2001.
Product illustration of a Guided Mechanism, Images and information from website of Mold Hotrunner Solutions (date unknown).
Press Release entitled "Mold-Masters Introduces The New Accu-Gate Virtually Eliminating Gate Wear" (Dec. 12, 2002).
PCT Search Report for WO 03/70446 (Appl. No. PCT/CA03/00244), dated May 16, 2003.
Hydraulic Injection Molding Machinery, Cincinnati Milacron pamphlet (1984).
Machine Translation from PAJ Website for JP 06-143358, published May 24, 1994.

HOT RUNNER NOZZLE WITH A TIP, A TIP SURROUNDING PIECE AND AN ALIGNMENT PIECE

This application claims the benefit of U.S. Provisional Application No. 60/427,926, filed on Nov. 21, 2002.

FIELD OF THE INVENTION

This invention relates to an injection molding apparatus, and more particularly to a hot runner nozzle for an injection molding apparatus.

BACKGROUND OF THE INVENTION

In a hot runner injection molding apparatus, melt is transferred from a melt source through a system of runners, through a nozzle and into a mold cavity through a gate. When the mold cavity is opened for the ejection of the molded part, it is important to prevent leakage of hot melt from the nozzle through the gate.

A valve pin is commonly used to seal the gate into the mold cavity prior to opening the mold cavity. The valve pin is positioned in the nozzle, and is movable into and out of the gate to control the flow of melt therethrough.

Proper alignment of the valve pin with respect to the gate can impact on the longevity of both the valve pin and the gate, and the effectiveness of the seal obtained by the valve pin and the gate. To this end, some nozzles include some form of alignment means to align the valve pin prior to its entry into the gate. However, in order for the nozzle's alignment means to be effective, the nozzle itself must be positioned in alignment with respect to the gate. Several factors generally cause the nozzle to be misaligned with respect to the gate. One such factor is a build-up of error due to tolerances in the manufacturing of the mold plate in which the gates are positioned, the manifold plate to which the nozzles are attached, and the nozzles themselves. Another factor is that the mold plate and the manifold plate may undergo different rates of thermal expansion during the injection molding process, and the nozzles may be moved out of alignment with respect to the gates as a result.

The adjustment of the positioning of the nozzles on an injection molding apparatus is typically carried out on each nozzle individually, by re-machining each of the nozzle components until a satisfactory alignment is obtained. This can be a time-consuming process.

Furthermore, other problems exist with the alignment of the valve pin. For example, during use, melt typically surrounds the valve pin, and also surrounds the downstream end of the nozzle itself in some injection molding machines. If the melt does not exert pressure evenly on the valve pin or on the nozzle, the valve pin and/or the nozzle can be moved out of alignment because of the melt pressure.

Some nozzles do not incorporate a valve pin. For example, some nozzles include a 'torpedo' which is a tip that is generally conical at its downstream end and extends into the gate, to control the heating of the melt as close as possible to the entry of the melt into the mold cavity.

If the torpedo is even slightly misaligned, the flow into the mold cavity can become non-uniform and can cause several problems with the quality of the molded part. Injection molding apparatuses having nozzles with torpedoes suffer from similar problems to valve gated machines, in terms of misalignment and consequent re-machining of components.

A second issue exists with hot runner nozzles, and that is the need to control the temperature of melt in the nozzle. Temperature control of the melt is even more important towards the outlet of the nozzle.

SUMMARY OF THE INVENTION

In a first aspect, the invention is directed to a nozzle for an injection molding apparatus. The injection molding apparatus includes a manifold and a mold component. The manifold has at least one runner therein that is downstream from a melt source. The mold component defines at least one mold cavity and defines a gate into each mold cavity. The gate defines an axis. The mold component has a mold component alignment surface thereon. The nozzle includes a nozzle body, a tip, a tip surrounding piece and an alignment piece. The nozzle body defines a nozzle body melt passage, which is adapted to be in fluid communication and downstream from the at least one runner. The tip is removably connected to the nozzle body. The tip defines a tip melt passage therethrough. The tip melt passage is downstream from and in fluid communication with the nozzle body melt passage, and is upstream from and in fluid communication with the gate. The tip surrounding piece is removably connected with respect to the nozzle body. The alignment piece is positioned between the tip and the tip surrounding piece.

In one embodiment of the first aspect, the tip contacts the alignment piece to align the tip with respect to the alignment piece. The alignment piece contacts the tip surrounding piece to align the alignment piece with respect to the tip surrounding piece. The tip surrounding piece is adapted to contact the mold component to align the tip surrounding piece with respect to the gate, so that the tip is aligned with respect to the gate. The contact between the tip, the alignment piece, the tip surrounding piece and the mold component is adapted to be axially proximate the gate.

In a second aspect, the invention is directed to a nozzle for an injection molding apparatus. The injection molding apparatus includes a mold component. The mold component defines at least one mold cavity and defines a gate into each mold cavity. The nozzle includes a nozzle body, a tip, a tip surrounding piece and an alignment piece. The nozzle body defines a nozzle body melt passage, which is adapted to be in fluid communication and downstream from a melt source. The tip is removably connected to the nozzle body. The tip defines a tip melt passage therethrough. The tip melt passage is downstream from and in fluid communication with the nozzle body melt passage, and is upstream from and in fluid communication with the gate. The tip surrounding piece is removably connected with respect to the nozzle body. The alignment piece is positioned between the tip and the tip surrounding piece.

In a third aspect, the invention is directed to a nozzle for an injection molding apparatus. The injection molding apparatus includes a mold component. The mold component defines at least one mold cavity and defines a gate into each mold cavity. The nozzle includes a nozzle body, a tip, a tip surrounding piece and a tip retaining piece. The nozzle body defines a nozzle body melt passage, which is adapted to be in fluid communication and downstream from a melt source. The tip is removably connected to the nozzle body. The tip defines a tip melt passage therethrough. The tip melt passage is downstream from and in fluid communication with the nozzle body melt passage, and is upstream from and in fluid communication with the gate. The tip surrounding piece is removably connected with respect to the nozzle body. The tip retaining piece is positioned between the tip surrounding piece and the tip. The tip surrounding piece retains the tip through the tip retaining piece.

In a fourth aspect, the invention relates to a nozzle for an injection molding machine. The injection molding machine has a mold block that defines at least one mold cavity with a gate leading thereto. The nozzle has a nozzle body, a tip, a tip surrounding piece and an alignment piece. The tip is mounted with respect to the nozzle body, such as by being mounted directly to the nozzle body, or by being mounted to another component that is connected to the nozzle body. The tip has an upstream end and a downstream end. The tip has at least one upstream alignment surface that cooperates with an alignment surface on another component of the nozzle, such as the nozzle body, to align the tip with respect to the nozzle body upstream from the downstream end. The alignment piece is positioned between the tip surrounding piece and the tip. The alignment piece contacts and aligns the tip downstream from the upstream alignment surface, which provides alignment of the tip closer to the gate than is provided by the upstream alignment surface. The alignment of the tip by the alignment piece cooperates with the alignment provided upstream at the upstream alignment surface to capture the tip by some alignment means at at least two positions along its length. Capturing the tip in this way resists misalignment from operational influences during the operation of the injection molding machine. One of the at least two positions at which the tip is captured is preferably proximate the downstream end of the tip.

In a fifth aspect, the invention relates to a nozzle for an injection molding machine. The injection molding machine has a mold block that defines at least one mold cavity with a gate leading thereto. The gate defines an axis. The nozzle has a nozzle body, a tip, a tip surrounding piece and an alignment piece. The tip is mounted with respect to the nozzle body, such as by being mounted directly to the nozzle body, or by being mounted to another component that is connected to the nozzle body. The tip and the tip surrounding piece each have an upstream end and a downstream end. The downstream ends of both the tip and the tip surrounding piece are generally axially close to the gate. The alignment piece is positioned between the tip surrounding piece and the tip and is proximate the downstream end of at least one of the tip surrounding piece and the tip, thereby aligning the tip generally close to the gate while still being positioned between the tip and the tip surrounding piece.

In a sixth aspect, the invention relates to a nozzle for an injection molding machine. The injection molding machine has a mold block that defines at least one mold cavity with a gate leading thereto. The gate is positioned at the end of a nozzle well. The nozzle has a nozzle body, a tip, a tip surrounding piece and an alignment piece. The tip is mounted with respect to the nozzle body, such as by being mounted directly to the nozzle body, or by being mounted to another component that is connected to the nozzle body. The tip surrounding piece is mounted with respect to the nozzle body. The tip surrounding piece contacts the mold block in the nozzle well, and is aligned by the nozzle well. The alignment piece is positioned between the tip surrounding piece and the tip. The alignment piece is aligned by the tip surrounding piece. The tip is aligned by the alignment piece. In this way, the alignment piece provides the tip 36 with alignment that is based on the nozzle well, which surrounds the gate 28, instead of being based on alignment with respect to the nozzle body 31. By aligning with respect to the nozzle well, some sources of misalignment which are related to the nozzle body 31 are eliminated.

In a seventh aspect, the present invention is directed to an injection molding apparatus that incorporates at least one of the nozzles described above.

In any of the aspects described above, a valve pin may be provided that is movable in the nozzle melt channel to provide control of the melt flow through the gate. In at least one position, the valve pin enters the gate and cooperates therewith to prevent melt flow through the gate. The tip may include internal alignment surfaces that contact the valve pin to align the valve pin prior to its entry into the gate.

DESCRIPTION OF THE DRAWINGS

For a better understanding of the present invention and to show more clearly how it may be carried into effect, reference will now be made by way of example to the accompanying drawings, in which.

DESCRIPTION OF THE PREFERED EMBODIMENTS

Figure 1:
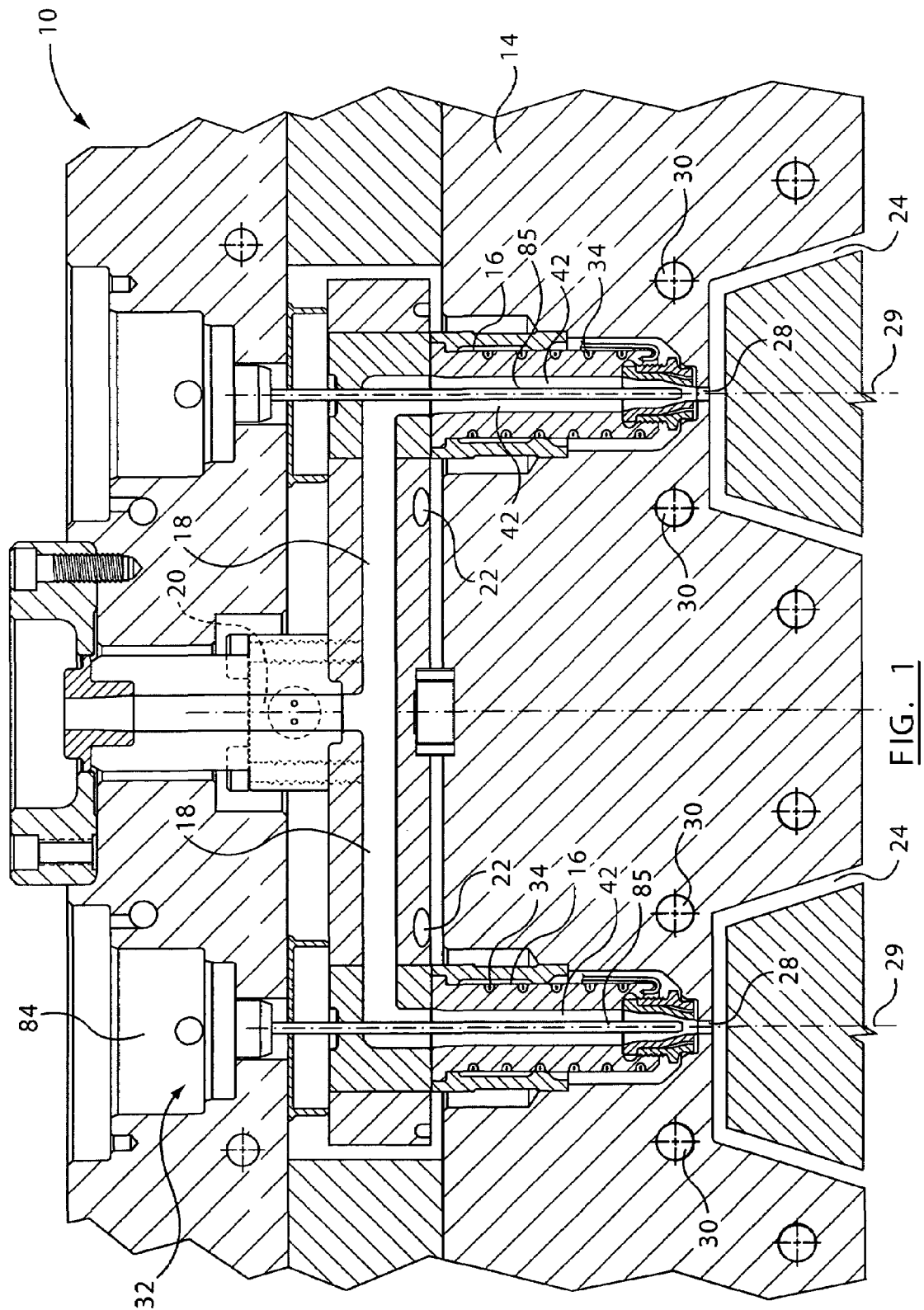
FIG. 1 is a sectional view of an injection molding apparatus having a plurality of nozzles in accordance with a first embodiment of the present invention.

Reference is made to FIG. 1, which shows an injection molding apparatus 10, which includes a manifold 12, a mold component 14 and a plurality of nozzles 16 in accordance with a first embodiment of the present invention.

The manifold 12 includes a plurality of runners 18, which transfer melt from a main runner inlet 20 to the nozzles 16. The manifold 12 may be heated by a heater 22.

The mold component 14 is made up of a plurality of mold plates, which together define a plurality of mold cavities 24. A gate 28 into each mold cavity 24 is defined in the mold component 14. Each gate 28 is positioned downstream from one of the nozzles 16. Each gate 28 defines an axis 29.

A plurality of cooling channels 30 may be included in the mold component 14. The cooling channels 30 transport a cooling fluid throughout the mold component 14 to cool and solidify melt in the mold cavities 24. It is alternatively possible that the mold component 14 be cooled by any other means known in the art.

Figure 2:
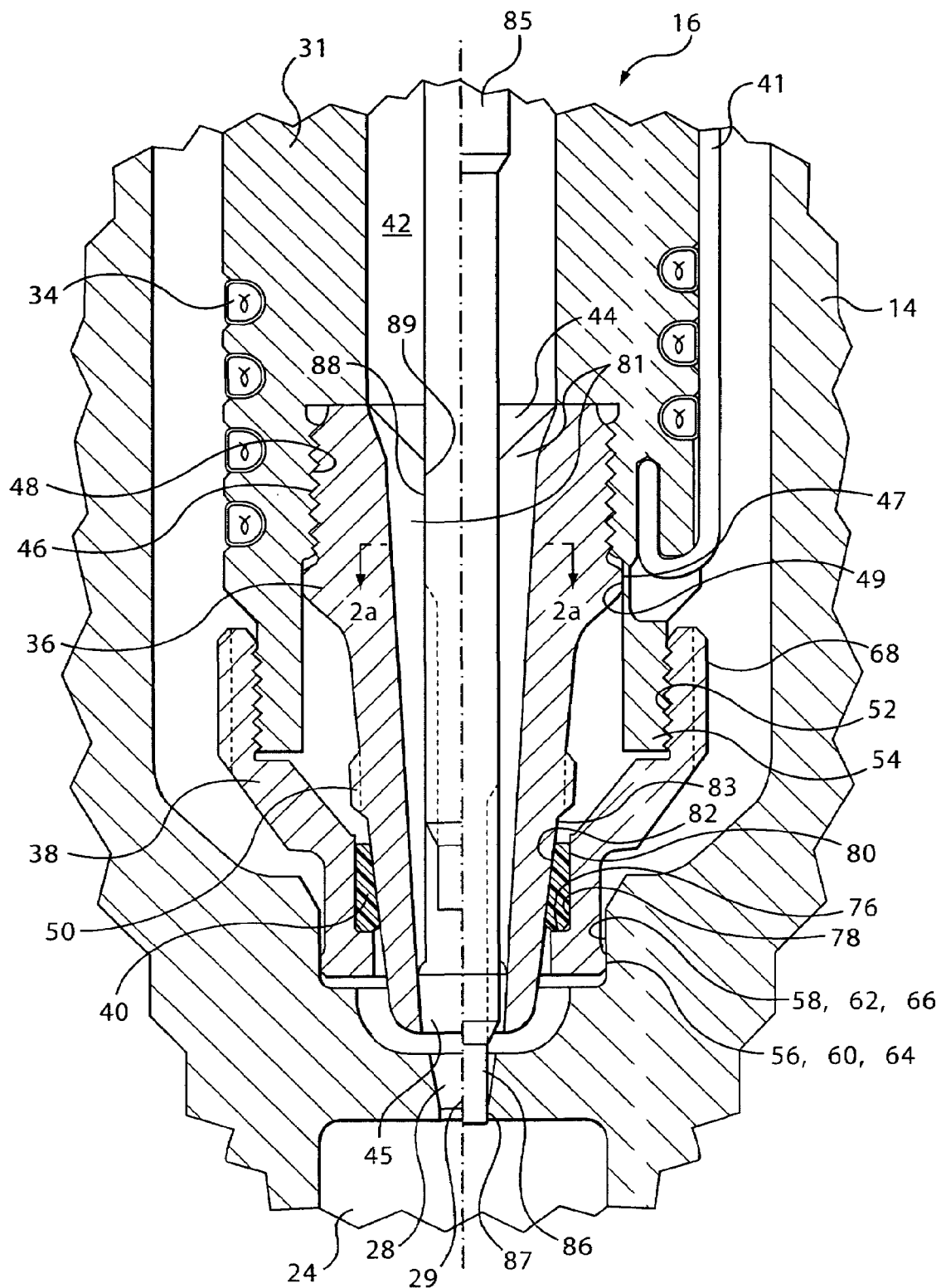
FIG. 2 is a magnified sectional view of a portion of the nozzle shown in FIG. 1.

Reference is made to FIG. 2. Each nozzle 16 transfers melt from the manifold 12 (FIG. 1) to one of the mold cavities 24 in the mold component 14. Each nozzle 16 includes a nozzle body 31, a valve pin system 32 (FIG. 1), a heater 34, a tip 36, a tip surrounding piece 38 and an alignment piece 40 and an optional thermocouple 41.

The nozzle body 31 defines a nozzle body melt passage 42 which receives melt from one of the runners 18 (FIG. 1). The heater 34 is connected to the nozzle body 31 for heating melt in the nozzle 16. The heater 34 may be any suitable kind of heater, such as a resistive wire heater, or a sleeve heater, as long as it is thermally connected to the nozzle body 31, ie. as long as the heater 34 is connected such that heat is transferable from the heater 34 to the nozzle body 31. For example, the heater 34 may wrap around the nozzle body 31 in a groove in the outer surface of the nozzle body 31.

The tip 36 defines a tip melt passage 44, and is connected to the nozzle body 31 so that the tip melt passage 44 is in fluid communication with and downstream from the nozzle body melt passage 42.

As melt passes through and exits the tip 36, it can cause wear to the tip 36, particularly at the outlet of the tip melt passage 44, which is shown at 45. By making the tip 36 removably connected to the nozzle body 31, the tip 36 can be removed and replaced as necessary without requiring the replacement of the entire nozzle body 31.

The removable connection of the tip 36 to the nozzle body 31 may be made in any suitable way. For example, the tip 36 may include a first threaded portion 46, which mates with a corresponding second threaded portion 48 on the nozzle body 31. In the embodiment shown in FIG. 2, the tip 36 is externally threaded, and the nozzle body 31 is internally threaded. However, the tip 36 could alternatively have an internally threaded portion, and could mate with an externally threaded portion on the nozzle body 31. The tip 36 may mate with the nozzle body 31 in any suitable way.

The threaded portions 46 and 48 may provide some alignment of the tip 36 with respect to the nozzle body 31. However, because the surfaces 46 and 48 are threaded, they are limited in the precision with which they can be used to align the tip 36.

To provide improved alignment of the tip 36, relative to any alignment provided by threaded portions 46 and 48, the tip 36 may further include a first upstream alignment surface 47 which cooperates with a second upstream alignment surface 49 on the nozzle body 31.

The tip 36 may be made from a wear resistant material, to resist wear that can occur as a result of the melt flow therethrough. For example, the tip 36 may be made from Be—Cu (Beryllium-Copper) which is a wear resistant material.

In relation to the separate issue of heat transfer, the tip 36 may be made from a tip material having a relatively high thermal conductivity to reduce losses in the heat transferred from the heater 34 to the melt in the tip melt passage 44. Some examples of suitable tip materials for the tip 36 are Be—Cu (Beryllium-Copper), Beryllium-free Copper such as, for example, Ampco 940™, TZM (Titanium/Zirconium carbide), Aluminum or Aluminum-based alloys, Inconel™, Molybdenum or suitable Molybdenum alloys, H13, mold steel or AerMet 100™. Be—Cu is a material of construction for the tip 36 that has both suitably high thermal conductivity and suitably high wear-resistance.

The tip 36 may include a tool engagement portion 50 for receiving a tool (not shown), to facilitate the installation and removal of the tip 36 with respect to the nozzle body 31.

The tip surrounding piece 38 may be removably attached to the nozzle body 31. The tip surrounding piece 38 may include a third threaded portion 52 which mates with a corresponding fourth threaded portion 54 on the nozzle body 31. It is contemplated that an alternative configuration (not shown) of the nozzle body 31, the tip 36 and the tip surrounding piece 38 could be made whereby a first threaded portion and a third threaded portion could mate with a common second threaded portion adapted to receive both. As another alternative (not shown), the tip surrounding piece 38 could attach to the mold component 14 instead of the nozzle body 31.

In the embodiment shown in FIG. 2, the threaded portion 52 is externally threaded, and the threaded portion 54 is internally threaded. Alternatively, however, the threaded portions 52 and 54 may be threaded in any suitable fashion for the removable attachment of the tip surrounding piece 38 to the nozzle body 31.

The tip surrounding piece 38 includes a first alignment surface 56, which cooperates with a second alignment surface 58 on the mold component 14 to align the tip surrounding piece 38 with respect to the gate 28. The first alignment surface 56 may, for example, comprise an outer cylindrical surface 60 of the tip surrounding piece 38, which mates with a bore 62 that is part of the nozzle well in the mold component 14.

In addition to aligning the tip surrounding piece 38 with respect to the gate 28, the first and second alignment surfaces 56 and 58 may also function as a first sealing surface 64 and a second sealing surface 66 respectively, to seal against melt leakage out of the space between the tip 36 and the gate 28.

The seal formed by the first and second sealing portions 64 and 66 may be any suitable type of seal. For example, they may contact each other to form a mechanical seal.

The tip surrounding piece 38 may include a tool engagement portion 68 for receiving a tool (not shown) to facilitate the installation of the tip surrounding piece 38 on the nozzle body 31 and removal therefrom.

The tip surrounding piece 38 may be positioned between portions of the nozzle 16 that contain melt, such as the nozzle body 31 and the mold component 14. For at least some portion of an injection molding cycle, the melt in the mold component 14 and the melt in the nozzle 16 may be maintained at different temperatures. For example, once the mold cavity 24 is filled with melt, the mold component 14 may be cooled to solidify the melt in the mold cavity 24. However, the nozzle 16 may be heated to keep the melt contained therein hot and ready for the next injection phase. In order to reduce unwanted heat transfer between the nozzle 16 and the mold component 14, the tip surrounding piece 38 may be made from a tip surrounding piece material that is comparatively less thermally conductive than the tip material of the tip 36. Suitable materials for the tip surrounding piece 38 include titanium, stainless steel, and chrome steel. Other alternative materials include ceramics and plastics. Other suitable materials for the tip surrounding piece 38 are disclosed in U.S. Pat. No. 5,879,727 (Puri), which is hereby incorporated by reference. Puri discloses such materials for use as an insulative layer for a nozzle.

The tip surrounding piece 38 may be made from the same material as the tip 36, however. For example, the tip surrounding piece material may be made from H13 or mold steel. Regardless of the material of manufacture for the tip surrounding piece 38, the tip surrounding piece 38 may be configured to have a relatively small contact surface area with the mold component 14 at the sealing portion 64 and/or the alignment surface 56, to reduce heat transfer between the tip surrounding piece 38 and the mold component 14.

The tip surrounding piece 38 is subject to wear from sliding movement between the first and second alignment surfaces 56 and 58. Such movement occurs as a result of the repeated cycles of thermal expansion and contraction of the nozzle 16 that occur during an injection molding operation.

The tip surrounding piece 38 is preferably made from a wear resistant material so as to resist the wear that is incurred during use. In light of the above considerations, the tip surrounding piece 38 is preferably made from a material having a low thermal conductivity and high wear resistance.

The tip surrounding piece 38 includes a shoulder 76 for retaining the alignment piece 40, and a third alignment surface 78 which mates with a fourth alignment surface 80 on the alignment piece 40. The third and fourth alignment surfaces 78 and 80 cooperate to align the alignment piece 40 with respect to the tip surrounding piece 38 and also with respect to the gate 28.

The alignment piece 40 is positioned on the shoulder 76 and, in turn, aligns the tip outlet 45 with respect to the gate 28. The alignment piece 40 includes a fifth alignment surface 82 which mates with a sixth alignment surface 83 on the tip 36. The fifth and sixth alignment surfaces 82 and 83 may be frusto-conical surfaces to facilitate the installation of the tip surrounding piece 38 and the alignment piece 40 on the nozzle body 31.

The alignment piece 40 provides alignment for the tip 36 at a position closer to the gate 28 than the alignment provided by the upstream alignment means for the tip 36. In the embodiment shown in FIG. 2, the alignment piece 40 provides alignment relatively close to the gate 28 relative to the alignment that is provided further upstream for the tip 36 by the cooperation of the surfaces 47 and 49.

The alignment of the tip 36 by the alignment piece 40 cooperates with the alignment provided upstream to resist misalignment from operational influences during the operation of the injection molding machine. This is because the tip 36 is captured by some alignment means at at least two positions along its length. One of the at least two positions is preferably proximate the downstream end of the tip 36, which is the end nearest the gate 28.

The alignment piece 40 provides the tip 36 with alignment that is based on the nozzle well, which surrounds the gate 28, instead of being based on alignment with respect to the nozzle body 31. By aligning with respect to the nozzle well, some sources of misalignment which are related to the nozzle body 31 are eliminated.

The alignment piece 40 is positioned proximate the downstream end of at least one of the tip 36 and the tip surrounding piece 38, thereby aligning the tip 36 close to the gate 28 while still being positioned between the tip 36 and the tip surrounding piece 38. In the embodiment shown in FIG. 2, the alignment piece 40 is positioned proximate the downstream end of the tip surrounding piece 38.

The alignment piece 40 may be made to inhibit heat losses from the tip 36 to the tip surrounding piece 38. For example, the alignment piece 40 may be made from an alignment piece material that has a thermal conductivity that is lower than that of the tip 36. For example, the alignment piece 40 may be made from ceramic or titanium. As another alternative material of fabrication, the alignment piece 40 may be made from Beryllium-Copper (Be—Cu).

Figure 2A:
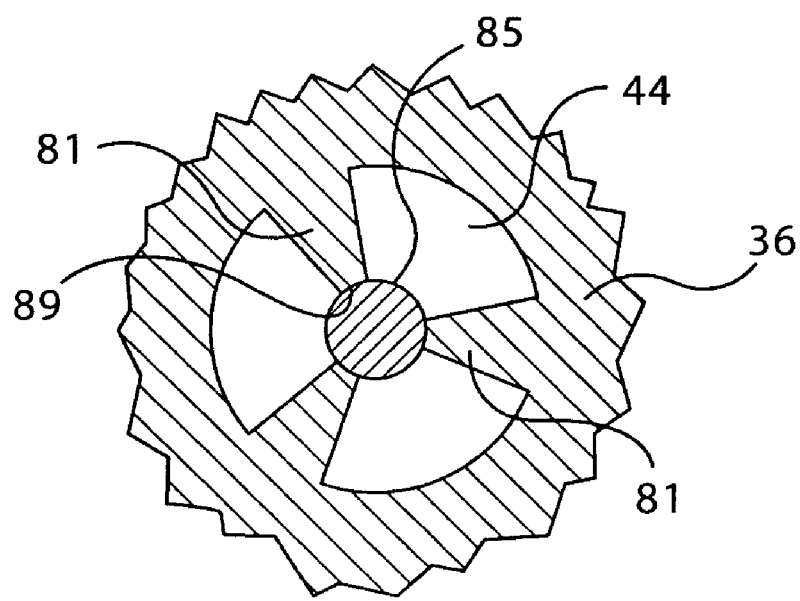
FIG. 2a is a cross-sectional view along section 2a—2a of the nozzle shown in FIG. 2.
Figure 2B:
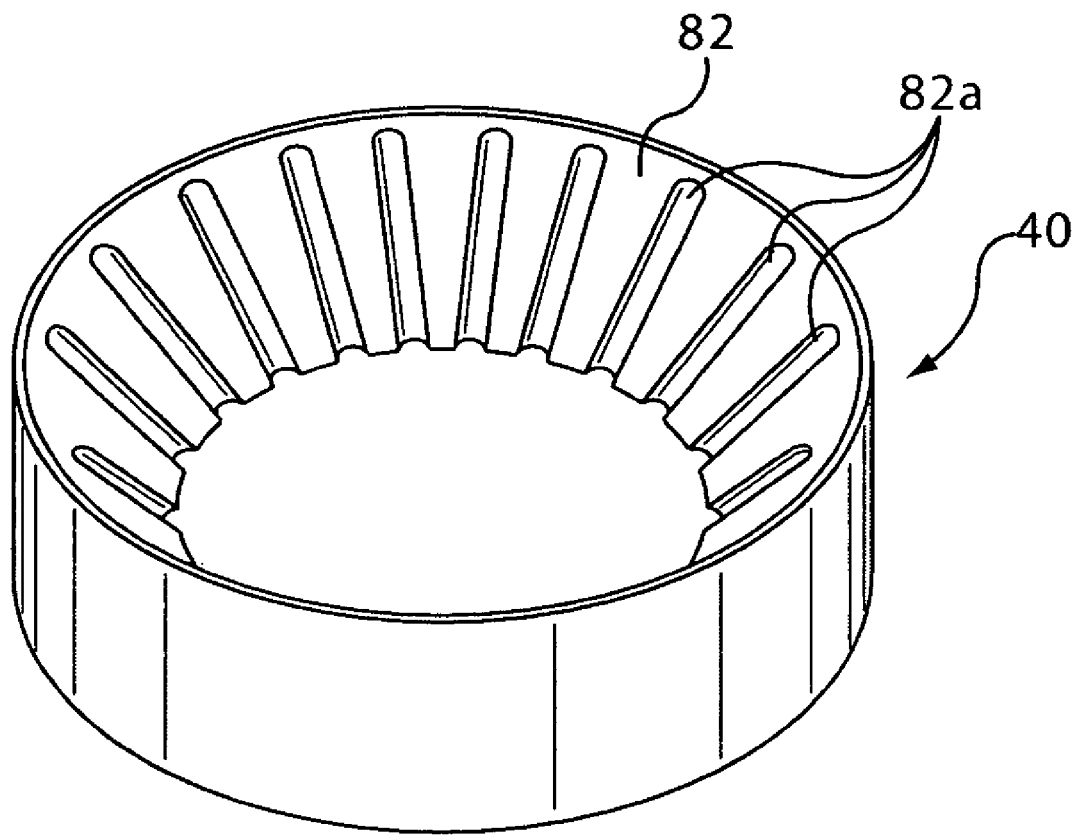
FIG. 2b is a magnified perspective view of the alignment piece shown in FIG. 2, shown with optional grooves on a tip, contacting surface.

As another example of making the alignment piece 40 in a way that inhibits heat loss from the tip 36, the alignment piece 40 may have a configuration as shown in FIG. 2b. As shown in FIG. 2b, the alignment piece 40 may be made to have a reduced surface area on its fifth alignment surface 82. The reduction in the surface area of contact for surface 82 may be achieved in any suitable configuration. For example, the surface 82 may have longitudinal grooves 82a therein.

By inhibiting heat loss from the tip 36, more heat is transferred to the melt contained in the tip 36, which assists in maintaining the melt therein at a desired temperature.

Referring to FIG. 1, the valve pin systems 32 are used to open and close the gates 28. Each valve pin system 32 includes an actuator 84 and a valve pin 85. The actuator 84 moves the valve pin 85 into and out of the gate 28 to control melt flow through the gate 28. The actuator 84 may be any suitable type of actuator, such as a pneumatically or hydraulically actuated piston in a chamber.

Referring to FIG. 2, the valve pin 85 may be removably attached to the actuator 84 for easy replacement when desired. The valve pin 85 includes a valve pin tip portion 86 which has a closing surface 87. The closing surface 87 is adapted to cooperate with the gate 28 to close the gate 28 against melt flow.

The actuator 84 moves the valve pin 85 between a closed position wherein the closing surface 87 cooperates with the gate 28 to prevent melt flow through the gate 28, and an open position wherein the valve pin 85, and in particular, the closing surface 87, is spaced from the gate 28 to permit melt to flow through the gate 28. The valve pin 85 is shown in part in both the open and closed positions in FIGS. 2, 3 and 5.

The valve pin 85 may also optionally include a seventh alignment surface 88 that is upstream from the valve pin tip portion 86. The seventh alignment surface 88 is adapted to cooperate with an eighth alignment surface 89 that is positioned on the tip 36 to align the valve pin 85 with respect to the tip 36 (see FIG. 2a).

The seventh alignment surface 88 may be on a portion of the valve pin 85 that has a larger diameter than the valve pin tip portion 86. During movement of the valve pin 85, the seventh alignment surface 88 incurs wear from the sliding contact with the eighth alignment surface 89, as it aligns the valve pin 85. By having the wear occur on the seventh alignment surface 88 and by having the closing surface 87 aligned with respect to the gate 28, the closing surface 87 incurs reduced wear during entry into the gate 28, and the gate 28 itself incurs reduced wear.

It is alternatively possible, however, for the valve pin 85 to not include a separate seventh alignment surface and for the closing surface 87 on the valve pin tip portion 86 to act as a seventh alignment surface. In that case, the valve pin tip portion 86 may have the same diameter from the portion of the valve pin 85 immediately upstream. The closing surface 87 would cooperate with the eighth alignment surface 89 to align the valve pin 85 prior to entry into the gate 28. In this alternative, the closing surface 87 would incur wear, however, the gate 28 would still incur reduced wear because the valve pin 85 would be aligned prior to entry therein.

The eighth alignment surface 89 may be positioned on one or more fins 81 that extend from the wall of the tip melt passage 44.

When the nozzle 16 is assembled with the mold component 14, the second alignment surface 58 in the bore 62 aligns the tip surrounding piece 38, which, in turn aligns the alignment piece 40. The fifth and sixth alignment surfaces 82 and 83 on the alignment piece 40 and the tip 36 can cooperate as necessary to align the tip 36, and, in turn, the valve pin 85 with the gate 28.

All of the alignment surfaces 56, 58, 78, 80, 82, 83, 88 and 89 are generally positioned axially proximate the gate 28. In other words, the alignment surfaces 56, 58, 78, 80, 82, 83, 88 and 89 are all positioned generally near the gate 28 along axis 29, regardless of their lateral position with respect to the gate 28. By positioning the alignment surfaces 56, 58, 78, 80, 82, 83, 88 and 89 axially proximate the gate 28, the tip 36 and the valve pin 85 are better secured in alignment with respect to the gate 28. The alignment is less prone to error due to tolerances in the manufacture of the manifold 12 and the mold component 14, because the alignment is done substantially entirely from the bore 62 of the nozzle well laterally over to the tip 36 without regard to the exact positioning of the nozzle body 31 and without regard to the accuracy of the location of the attachment of the nozzle to the manifold 12. Furthermore, the alignment of the tip 36 and the valve pin 85 is less easily upset by external sources, such as asymmetry in the melt pressure or differences in the rates of thermal expansion of the manifold 12 and the mold component 14. It is not necessary, though it is preferable for the alignment surfaces 56, 58, 78, 80, 82, 83, 88 and 89 to overlap axially.

The optional thermocouple 41 may be mounted in any suitable way in the nozzle 16 for sensing the temperature of melt flowing through the nozzle 16. The thermocouple 41 sends a signal corresponding to the sensed temperature back to a control system (not shown), which can be used to control the heat output of the heater 34.

Figure 3A:
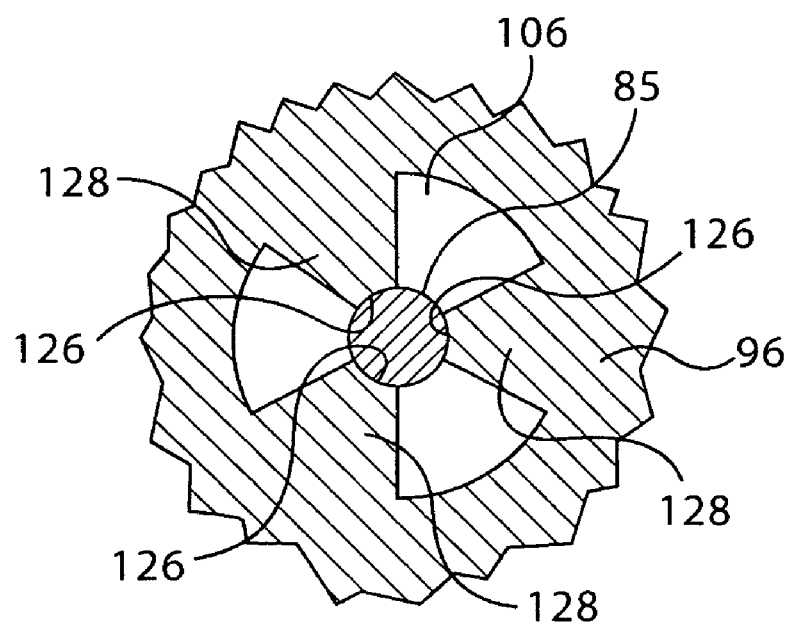
FIG. 3a is a cross-sectional view along section 3a—3a of the nozzle shown in FIG. 3.
Figure 3:
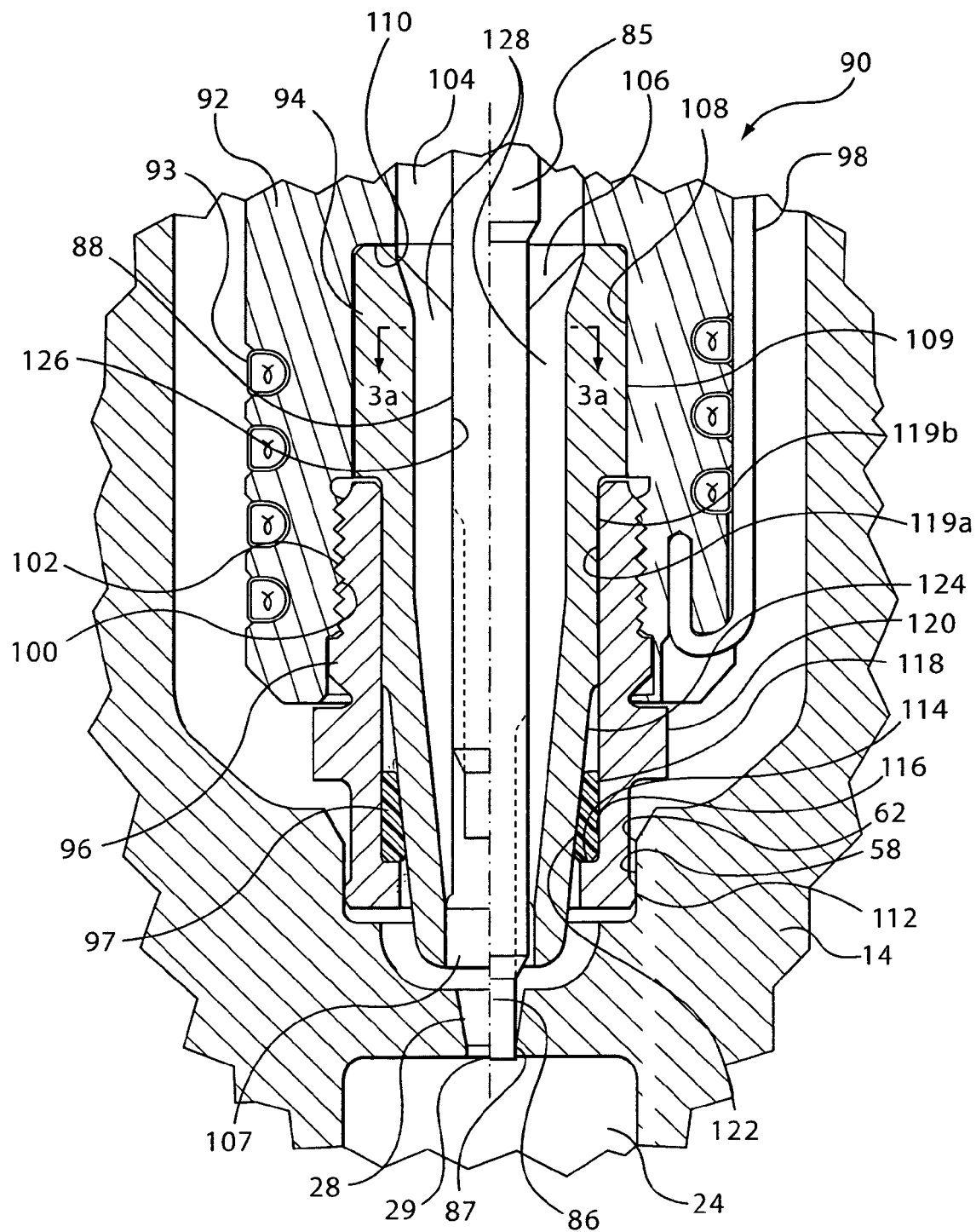
FIG. 3 is a magnified sectional view of a portion of a nozzle in accordance with another embodiment of the present invention.

Reference is made to FIG. 3, which shows a nozzle 90 in accordance with another embodiment of the present invention. The nozzle 90 includes a nozzle body 92, a heater 93, a tip 94, a tip surrounding piece 96, an alignment piece 97, the valve pin system 32 (FIG. 1) and an optional thermocouple 98. The nozzle body 92 may be similar to the nozzle body 31 (FIG. 2), and may include a first threaded portion 100 for receiving a corresponding second threaded portion 102 on the tip surrounding piece 96. In the embodiment shown in FIG. 3, the nozzle body 92 does not include a threaded portion for receiving the tip 94.

The nozzle body 92 defines a nozzle body melt passage 104, which may be similar to the nozzle body melt passage 42 (FIG. 2). The heater 93 may be similar to the heater 34 and may be positioned anywhere suitable for heating melt in the nozzle 90.

The tip 94 may be similar to the tip 36 (FIG. 2) and defines a tip melt passage 106 therethrough. The tip melt passage 106 ends at a tip outlet 107.

The tip 94 does not have a threaded portion thereon for attachment to the nozzle body 92, and is instead retained in place in the nozzle 90 by the tip surrounding piece 96.

The tip 94 fits within a bore 108 in the nozzle body 92, whereby the tip melt passage 106 is in fluid communication with the nozzle body melt passage 104. An outer surface 109 on the tip 94 may cooperate with the bore 108 to align the tip 94 with respect to the nozzle body 92.

The tip 94 abuts a shoulder 110 in the bore 108, and forms a seal therewith to prevent melt leakage therepast from within the nozzle body melt passage 104.

The tip 94 may be made from a relatively thermally conductive material, such as any of the materials used for the tip 36 (FIG. 2). As discussed above, the tip 94 may also be subject to a relatively abrasive or corrosive melt composition. Thus, the tip 94 may be made from a wear resistant material, such as Tungsten Carbide to provide an increased operating life. Depending on the material selected for the tip 94, a threaded portion can be relatively difficult to machine. Furthermore, such a threaded portion can be brittle and subject to premature failure, depending on the material of manufacture for the tip 94. Thus, by making the tip 94 threadless, a greater number of materials are available for its manufacture.

Also, by making the tip 94 threadless, some cost of manufacture is saved for the tip 94 and correspondingly for the nozzle body 92. In addition, by eliminating the need to include threads on the tip 94, the cost of replacement sets of tips 94 can be reduced.

The tip surrounding piece 96 may be similar to the tip surrounding piece 38 (FIG. 2), and includes a first alignment surface 112 for mating with the second alignment surface 58 on the bore 62, to align the tip surrounding piece 96 with the gate 28. The tip surrounding piece 96 also includes a shoulder 114 for retaining the alignment piece 97 and a third alignment surface 116 for mating with a fourth alignment surface 118 on the alignment piece 97.

The tip surrounding piece 96 retains the tip 94 in place in the bore 108 through the alignment piece 97. The tip surrounding piece 96 may include an alignment surface 119a, which cooperates with a surface 119b on the tip 94 to align the tip 94.

The tip surrounding piece 96 must be made strong enough to resist the melt pressures that can be exerted axially on the tip 94 during an injection molding operation. Furthermore, as described above, it is preferable for the tip surrounding piece 96 to have a relatively lower thermal conductivity than that of the nozzle body 92, and to have high wear resistance. The tip surrounding piece 96 may be made from any of the same materials as the tip surrounding piece 38 (FIG. 2), provided that it is configured to be strong enough to retain the tip 94.

The tip surrounding piece 96 may include a tool engagement portion 120 for the engagement of a tool (not shown), to facilitate the installation of the tip surrounding piece 96 on the rest of the nozzle 90 and removal therefrom.

One or more of the alignment means made up of the bore 108 and the surface 109 and the alignment means made up of the surfaces 119a and 119b constitute upstream alignment means for the tip 94.

The alignment piece 97 may be similar to the alignment piece 40, and is positioned between the tip 94 and the tip surrounding piece 96 to align the tip 94 with respect to the gate 28. The alignment piece 97 also directly retains the tip 94. The alignment piece 97 possesses sufficient rigidity to resist melt pressures that are exerted on the tip 94 during an injection molding operation.

The alignment piece 97 includes a fifth alignment surface 122 for mating with a sixth alignment surface 124 on the tip 94. The fifth and sixth alignment surfaces 122 and 124 may be frusto-conical to facilitate their mating during the installation of the tip surrounding piece 96 and the alignment piece 97 on the nozzle body 92.

The alignment piece 97 provides alignment of the tip 94 proximate the gate 28. Furthermore, the alignment piece 97 provides alignment of the tip 94 further downstream, ie. closer to the gate 28, than is provided by the upstream alignment means for the tip 94.

The alignment piece 97 may be made from a material that has a relatively lower thermal conductivity than that of the tip 94, and may be made from the same material as the alignment piece 40 (FIG. 2).

The valve pin 85 is movable in the nozzle body melt passage 104 and the tip melt passage 106 to open and close the gate 28. The seventh alignment surface 88 on the valve pin 85 mates with an eighth alignment surface 126 on the tip 94 (see FIG. 3a). The eighth alignment surface 126 may be positioned on one or more fins 128 extending from the wall of the tip melt passage 44.

When the nozzle 90 is assembled with the mold component 14, the bore 62 aligns the tip surrounding piece 96, which in turn aligns the alignment piece 97, which in turn aligns the tip 94, which in turn aligns the valve pin 85 with the gate 28. The alignment surfaces 58, 112, 116, 118, 122, 124, 88 and 126 are all generally axially proximate the gate 28.

Figure 4:
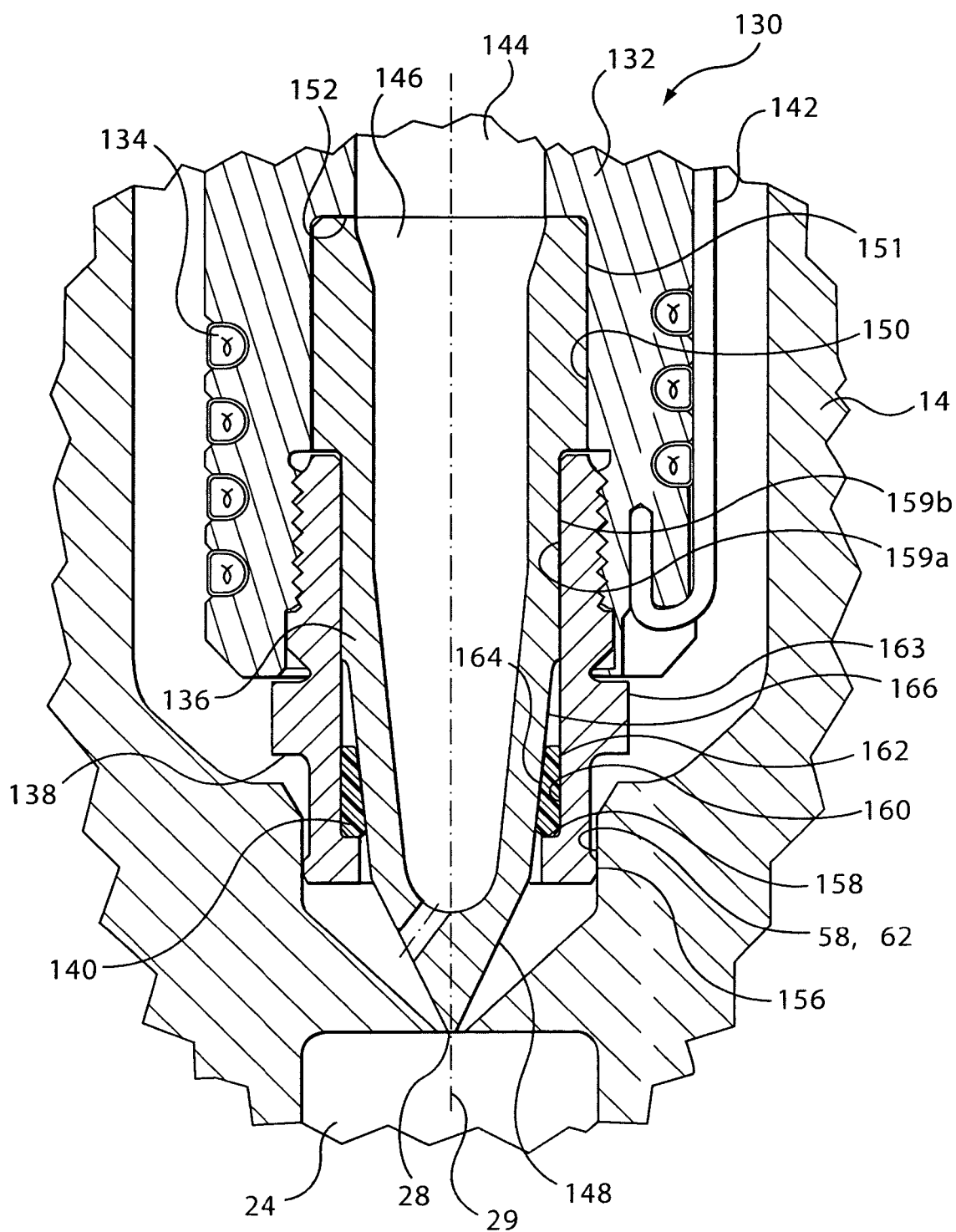
FIG. 4 is a magnified sectional view of a portion of a nozzle in accordance with another embodiment of the present invention.

Reference is made to FIG. 4, which shows a nozzle 130 in accordance with another embodiment of the present invention. The nozzle 130 may be similar to the nozzle 90 except that the nozzle 130 does not include a valve pin system. The nozzle 130 includes a nozzle body 132, a heater 134, a tip 136, a tip surrounding piece 138 and an alignment piece 140 and an optional thermocouple 142.

The nozzle body 132 may be similar to the nozzle body 92 (FIG. 3) and defines a nozzle melt passage 144. The heater 134 may be similar to the heater 93 (FIG. 3) and may be positioned anywhere suitable for heating melt in the nozzle 130.

The tip 136 may be similar to the tip 94 (FIG. 3) and defines a tip melt passage 146 therethrough. The tip 136, however, is not adapted for receiving a valve pin, and instead includes a torpedo portion 148. The torpedo portion 148 may extend to the gate 28 or alternatively into the gate 28. The torpedo portion 148 transfers heat from the heater 134 to the melt for improved control of the melt temperature as the melt enters the gate 28.

The tip 136 does not have a threaded portion thereon for attachment to the nozzle body 132, and is instead retained in place in the nozzle 130 by the tip surrounding piece 138.

The tip 136 fits within a bore 150 in the nozzle body 132, whereby the tip melt passage 146 is in fluid communication with the nozzle body melt passage 144. A surface 151 on the tip 136 may cooperate with the bore 150 to align the tip 136 with the nozzle body 132.

The tip 136 abuts a shoulder 152 in the bore 150, and forms a seal therewith to prevent melt leakage therepast from within the nozzle body melt passage 144.

The tip 136 may be made from a relatively thermally conductive material, such as any of the materials used for the tips 36 (FIG. 2) and 94 (FIG. 3).

Thermal gating may be used to close the gate 28 instead of a valve pin. Thus, when the mold cavity 24 is filled, coolant is run through the cooling channels to cool the mold component 14, thereby cooling and solidifying the molded part. As a consequence, melt that is present in the gate 28 is also cooled and solidifies. Thus, when the mold cavity 24 is opened for the ejection of the molded part, the solidified melt in the gate 28 prevents molten melt further upstream from leaking therepast. After the molded part is ejected, the mold cavity 24 is closed, the coolant flow is stopped and the heater 134 is activated to melt the solidified melt in the gate 28.

The tip surrounding piece 138 may be similar to the tip surrounding piece 96 (FIG. 3), and includes a first alignment surface 156 for mating with the second alignment surface 58 on the bore 62, to align the tip surrounding piece 138 with the gate 28. The tip surrounding piece 138 also includes a shoulder 158 for retaining the alignment piece 140 and a third alignment surface 160 for mating with a fourth alignment surface 162 on the alignment piece 140.

The tip surrounding piece 138 retains the tip 136 in place in the bore 150 through the alignment piece 140. The tip surrounding piece 138 may be made from any of the same materials as the tip surrounding piece 138 (FIG. 2).

A surface 159a on the tip surrounding piece 138 may cooperate with a surface 159b on the tip 136 to align the tip 136 with the tip surrounding piece 138.

The alignment piece 140 may be similar to the alignment piece 97 (FIG. 3), and is positioned between the tip 136 and the tip surrounding piece 138 to align the tip 136 with respect to the gate 28. The alignment piece 140 also directly retains the tip 136. The alignment piece 140 possesses sufficient rigidity to resist melt pressures that are exerted on the tip 136 during an injection molding operation.

The tip surrounding piece 138 may include an optional tool engagement portion 163, which can be engaged by a tool (not shown) to facilitate the installation of the tip surrounding piece 138 in the bore 62 and removal therefrom.

The alignment piece 140 includes a fifth alignment surface 164 for mating with a sixth alignment surface 166 on the tip 136. The fifth and sixth alignment surfaces 164 and 166 may be frusto-conical to facilitate assembly of the nozzle 130.

When the nozzle 130 is assembled with the mold component 14, the bore 62 aligns the tip surrounding piece 138, which in turn aligns the alignment piece 140, which in turn, aligns the tip 136 with respect to the gate 28. The alignment surfaces on the bore 62, the tip surrounding piece 138, the alignment piece 140 and the tip 136 are all generally axially proximate the gate 28.

The alignment piece 97 provides alignment of the tip 94 proximate the gate 28. Furthermore, the alignment piece 97 provides alignment of the tip 94 further downstream, ie. closer to the gate 28, than is provided by the upstream alignment means for the tip 94.

The alignment piece 140 may be made from a material that has a relatively lower thermal conductivity than that of the tip 136, and may be made from the same material as the alignment pieces 40 (FIG. 2) and 97 (FIG. 3).

Figure 5:
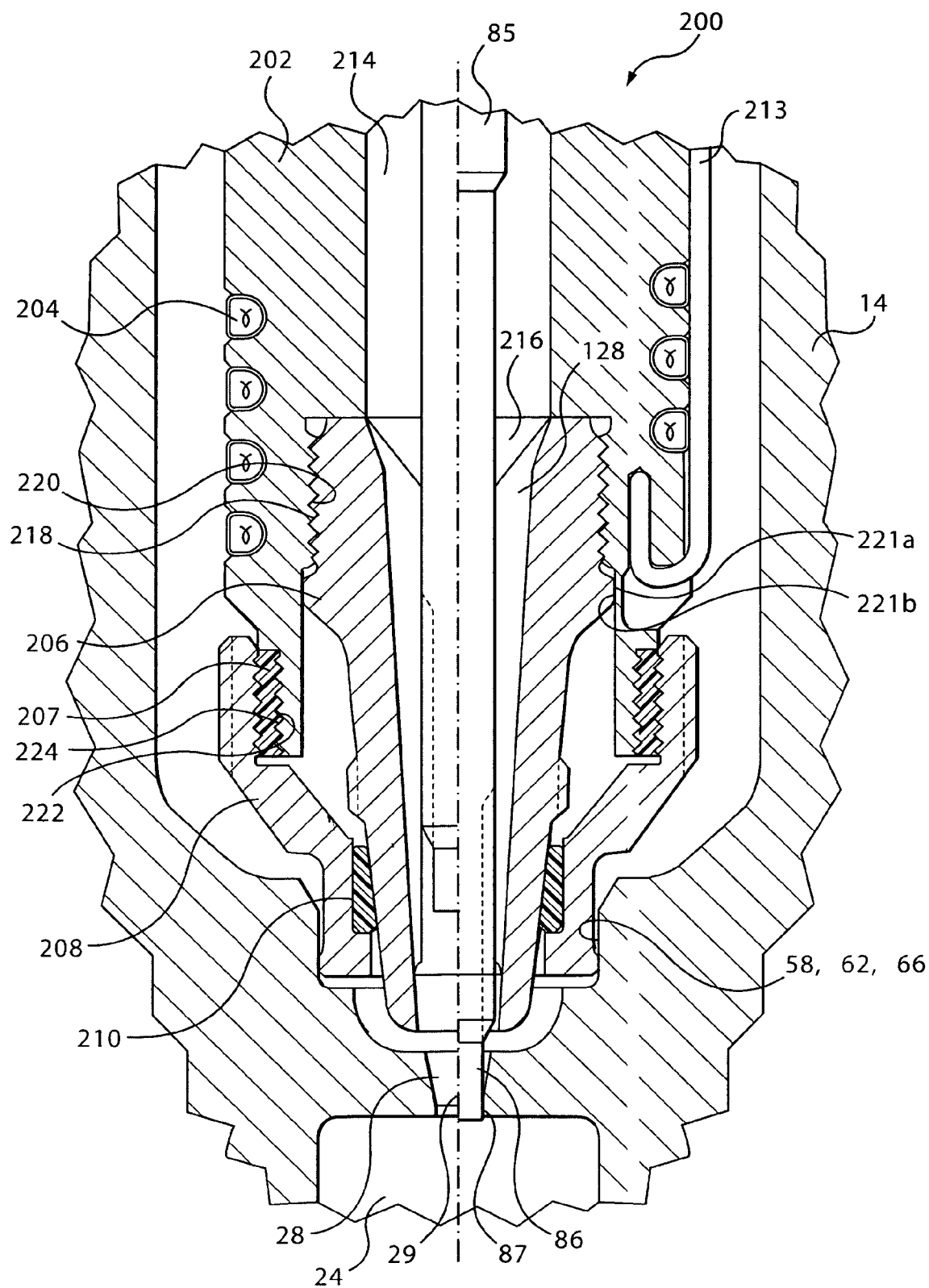
FIG. 5 is a magnified sectional view of a portion of a nozzle in accordance with yet another embodiment of the present invention.

Reference is made to FIG. 5, which shows a nozzle 200 in accordance with an alternative embodiment of the present invention. The nozzle 200 includes a nozzle body 202, a heater 204, a tip 206, an insulator piece 207, a tip surrounding piece 208 and an alignment piece 210, and may include an optional thermocouple 213. The nozzle 200 may be similar to the nozzle 16 except that in the nozzle 200, the tip surrounding piece 208 is not directly connected to the nozzle body 202, and is instead connected to the insulator piece 207, which itself may be directly connected to the nozzle body 202.

The nozzle body 202 may be similar to the nozzle body 31 (FIG. 2), and defines a nozzle body melt passage 214. The heater 204 may be similar to the heater 34 (FIG. 2) and may be mounted on the nozzle body 202 to heat melt in the nozzle 200. The optional thermocouple 213 may be similar to the thermocouple 41 and may be mounted in any suitable way in the nozzle 200 for sensing the temperature of melt flowing through the nozzle 200.

The tip 206 may be similar to the tip 36 (FIG. 2) and defines a tip melt passage 216. The tip 206 may be connected to the nozzle body 202 by means of a first threaded portion 218 and a corresponding second threaded portion 220, or by any other suitable connection means.

The cooperation of the threaded portions 220 and 218 may serve to align the tip 206 with respect to the nozzle body 202. Optionally, surfaces 221a and 221b on the tip 206 and the nozzle body 202 respectively, may be provided to provide improved alignment relative to the alignment provided by the threaded portions 220 and 218.

The insulator piece 207 may include a third threaded portion 222 for mounting to a fourth threaded portion 224 on the nozzle body 202. The insulator piece 207 may be made from a material having a relatively lower thermal conductivity than that of the piece to which it is mounted, which in the embodiment shown is the nozzle body 202. The reason for the lower thermal conductivity is discussed below.

The tip surrounding piece 208 may be similar to the tip surrounding piece 38 (FIG. 2). The tip surrounding piece 208 may be subject to wear from repeated thermal expansion and contraction during injection molding cycles. Furthermore, it may be desirable to reduce the amount of heat that is conducted from the rest of the nozzle 200 into the mold component 14, through the tip surrounding piece 208.

To satisfy the potentially conflicting needs of low thermal conductivity and high strength and wear resistance, the tip surrounding piece 208 may attach removably to the insulator piece 207. Because the insulator piece 207 have a lower thermal conductivity than that of the component to which it is attached (eg. the nozzle body 202), the heat transfer from that component is reduced to the tip surrounding piece 208. Thus, in this case, the tip surrounding piece 208 may be made from any suitably strong and wear resistant material, with less regard for its thermal conductivity.

The insulator piece 207 may also be positioned between the tip surrounding piece and the nozzle body in any of the embodiments described in FIGS. 2, 3 and 4.

The alignment piece 210 may be similar to the alignment piece 40 (FIG. 2). The alignment piece 210 aligns the tip 206 proximate the gate. The alignment piece 210 align the tip 206 closer to the gate than any alignment provided by the cooperation of the threaded portions 220 and 218 or the surfaces 221*a* and 221*b*.

When nozzles 16, 90, 130 and 200 are assembled to the mold component 14, alignment of the nozzle with the gate is obtained automatically, without requiring jig grinding or other re-machining of components. Because the nozzles 16, 90 and 200 are aligned with respect to the gate 28, the valve pin 85 is positioned in alignment with the gate 28 by means of the cooperation between the seventh and eighth alignment surfaces. Similarly, because the nozzle 130 is in alignment with the gate 28, the torpedo 148 is positioned in alignment with the gate 28.

It has been described in each of the embodiments shown in FIGS. 2, 3, 4 and 5, that the alignment surfaces between the alignment piece 40, 97, 140, 210 and the tip 36, 94, 136, 206 are frusto-conical to facilitate nozzle assembly. It will be noted that other mating pairs of alignment surfaces can be frusto-conical instead of those between the alignment piece and the tip. For example, the frusto-conical alignment surfaces may be between the tip surrounding piece and the alignment piece. Alternatively, an embodiment is contemplated where none of the mating pairs of alignment surfaces are frusto-conical, and are all instead generally cylindrical.

In the embodiments described above, the same surfaces serve as both the first and second sealing portions 64 and 66 and the first and second alignment surfaces 58 and 60. It is alternatively possible for the nozzle and mold component to each have separate surfaces for alignment and for sealing. In other words, the first and second sealing portions 64 and 66 may be separate surfaces from the first and second alignment surfaces 56 and 58.

It will be appreciated that some of the components described above may be attached to the mold component 14, instead of the nozzle 16, where suitable. For example, the tip surrounding piece may attach directly to the mold component 14.

While the above description constitutes the preferred embodiments, it will be appreciated that the present invention is susceptible to modification and change without departing from the fair meaning of the accompanying claims.

The invention claimed is:

1. A nozzle for an injection molding apparatus, said injection molding apparatus including a manifold and a mold component, said mold component defining at least one mold cavity, said mold component defining a gate into each mold cavity, said gate defining an axis, said mold component having a mold component alignment surface thereon, said nozzle comprising:
    a nozzle body, wherein said nozzle body defines a nozzle body melt passage;
    a tip that is removably connected to said nozzle body, wherein said tip defines a tip melt passage, said tip melt passage is downstream from and in fluid communication with said nozzle body melt passage, and said tip melt passage is adapted to be upstream from and in fluid communication with said gate;
    a tip surrounding piece that is removably connected with respect to said nozzle body; and
    an alignment piece positioned between said tip and said tip surrounding piece and free from contact with said nozzle body, and wherein said tip contacts said alignment piece to align said tip with respect to said alignment piece,
    wherein said alignment piece contacts said tip surrounding piece to align said alignment piece with respect to said tip surrounding piece, and wherein said tip surrounding piece is adapted to contact said mold component to align said tip surrounding piece with respect to said gate, so that said tip is aligned with respect to said gate, and wherein said contact between said tip, said alignment piece, said tip surrounding piece and said mold component are all adapted to be axially proximate said gate.

2. A nozzle as claimed in claim 1, wherein said tip has a tip thermal conductivity, said alignment piece has an alignment piece thermal conductivity, and said alignment piece thermal conductivity is less than said tip thermal conductivity.

3. A nozzle as claimed in claim 1, wherein said tip surrounding piece has a tip surrounding piece thermal conductivity and said tip has a tip thermal conductivity and said tip surrounding piece thermal conductivity is less than said tip thermal conductivity.

4. A nozzle as claimed in claim 1, wherein said tip surrounding piece is adapted to inhibit heat transfer between said nozzle and said mold component.

5. A nozzle as claimed in claim 1, wherein said tip surrounding piece is adapted to cooperate with said mold component to form a seal to inhibit melt leakage therebetween.

6. A nozzle as claimed in claim 1, wherein said tip has a first threaded portion and said nozzle body has a second threaded portion that mates with said first threaded portion.

7. A nozzle as claimed in claim 6, wherein said tip surrounding piece has a third threaded portion and said nozzle body has a fourth threaded portion that mates with said third threaded portion.

8. A nozzle as claimed in claim 1, wherein said tip surrounding piece retains said tip in place.

9. A nozzle as claimed in claim 1, wherein a portion of said tip surrounding piece is adapted to contact said mold component and said portion is sized so that a selected heat transfer occurs between said tip surrounding piece and said mold component.

10. A nozzle as claimed in claim 1, wherein said tip includes a torpedo portion that extends at least to said gate, said torpedo portion being configured for transmitting heat from a heater into melt entering said gate.

11. A nozzle as claimed in claim 1, further comprising a valve pin system that includes a valve pin and an actuator, wherein said valve pin has a closing surface and is movable through said tip melt channel between a closed position wherein said closing surface is adapted to cooperate with said gate to inhibit melt flow through said gate, and an open position wherein said valve pin is adapted to be spaced from said gate to permit melt flow through said gate, said valve pin has a valve pin alignment surface, said tip has a tip alignment surface positioned in said tip melt channel, and said valve pin alignment surface and said tip alignment surface are adapted to cooperate to align said valve pin with respect to said tip and with respect to said gate, and wherein said actuator is operatively connected to said valve pin.

12. A nozzle as claimed in claim 11, wherein said valve pin alignment surface is separate from said closing surface.

13. A nozzle as claimed in claim 1, wherein said tip has a tip alignment surface that is frusto-conical and said alignment piece has an alignment piece alignment surface that is configured to mate with said tip alignment surface.

14. A nozzle as claimed in claim 1, further comprising a heater, wherein said heater is thermally connected to said nozzle body for heating melt in said nozzle body melt passage.

15. An injection molding apparatus, comprising:
a manifold, a mold component and at least one nozzle,
wherein said manifold has at least one runner therein and said at least one runner is adapted to be downstream from a melt source,
wherein said mold component defines at least one mold cavity, said mold component defines a gate into each mold cavity, each said gate defines an axis, and said mold component has at least one mold component alignment surface thereon,
wherein each said nozzle includes a nozzle body, a tip, a tip surrounding piece, and an alignment piece,
wherein said nozzle body includes a first threaded portion and defines a nozzle body melt passage, and said nozzle body melt passage is in fluid communication with and downstream from one of said at least one runner,
wherein said tip includes a second threaded portion and is removably connected to said nozzle body through mating of the first and second threaded portions of the nozzle body and the tip, wherein said tip defines a tip melt passage, said tip melt passage is downstream from and in fluid communication with said nozzle body melt passage, and is upstream from and in fluid communication with said gate,
wherein said tip surrounding piece is removably connected with respect to said nozzle body,
wherein said alignment piece is positioned between said tip and said tip surrounding piece, and
wherein said tip contacts said alignment piece to align said tip with respect to said alignment piece, wherein said alignment piece contacts said tip surrounding piece to align said alignment piece with respect to said tip surrounding piece, and wherein said tip surrounding piece contacts one of said at least one mold component alignment surface to align said tip surrounding piece with respect to said gate, so that said tip is aligned with respect to said gate, and wherein said contact between said tip, said alignment piece, said tip surrounding piece and said mold component are all axially proximate said gate.

16. An injection molding apparatus as claimed in claim 15, wherein said tip has a tip thermal conductivity, said alignment piece has an alignment piece thermal conductivity, and said alignment piece thermal conductivity is less than said tip thermal conductivity.

17. An injection molding apparatus as claimed in claim 15, wherein said tip surrounding piece has a tip surrounding piece thermal conductivity and said tip has a tip thermal conductivity and said tip surrounding piece thermal conductivity is less than said tip thermal conductivity.

18. An injection molding apparatus as claimed in claim 15, wherein said tip surrounding piece is adapted to inhibit heat transfer between said nozzle and said mold component.

19. An injection molding apparatus as claimed in claim 15, wherein said tip surrounding piece cooperates with said mold component to form a seal to inhibit melt leakage therebetween.

20. An injection molding apparatus as claimed in claim 15, wherein said tip surrounding piece has a third threaded portion and said nozzle body has a fourth threaded portion that mates with said third threaded portion.

21. An injection molding apparatus as claimed in claim 15, wherein said tip surrounding piece retains said tip in place.

22. An injection molding apparatus as claimed in claim 15, wherein a portion of said tip surrounding piece contacts said mold component and is sized so that a selected heat transfer occurs between said tip surrounding piece and said mold component.

23. An injection molding apparatus as claimed in claim 15, wherein said tip includes a torpedo portion that extends at least to said gate, said torpedo portion being adapted for transmitting heat from a heater into melt entering said gate.

24. An injection molding apparatus as claimed in claim 15, further comprising a valve pin system that includes a valve pin and an actuator, wherein said valve pin has a closing surface and is movable through said tip melt channel between a closed position wherein said closing surface cooperates with said gate to inhibit melt flow through said gate, and an open position wherein said valve pin is spaced from said gate to permit melt flow through said gate, said valve pin has a valve pin alignment surface, said tip has a tip alignment surface positioned in said tip melt channel, and said valve pin alignment surface and said tip alignment surface are adapted to cooperate to align said valve pin with respect to said tip and with respect to said gate, and wherein said actuator is operatively connected to said valve pin.

25. An injection molding apparatus as claimed in claim 24, wherein said valve pin alignment surface is separate from said closing surface.

26. An injection molding apparatus as claimed in claim 15, further comprising a heater, wherein said heater is thermally connected to said nozzle body for heating melt in said nozzle body melt passage.

27. A nozzle for an injection molding apparatus, said injection molding apparatus including a manifold, and a mold component, said manifold having at least one runner therein, said at least one runner being downstream from a melt source, said mold component defining at least one mold cavity, said mold component defining a gate into each mold cavity, said gate defining an axis, said mold component having a mold component alignment surface thereon, said nozzle comprising:
a nozzle body, wherein said nozzle body defines a nozzle body melt passage, said nozzle body melt passage is adapted to be in fluid communication with and downstream from said at least one runner;
a tip that is removably connected to said nozzle body, wherein said tip defines a tip melt passage, said tip melt passage is downstream from and in fluid communication with said nozzle body melt passage, and said tip melt passage is adapted to be upstream from and in fluid communication with said gate;

a tip surrounding piece that is removably connected with respect to said nozzle body; and an alignment piece positioned between said tip and said tip surrounding piece, the alignment piece having non-parallel inner and outer surfaces.

28. A nozzle as claimed in claim 27, wherein said tip has a tip thermal conductivity, said alignment piece has an alignment piece thermal conductivity, and said alignment piece thermal conductivity is less than said tip thermal conductivity.

29. A nozzle as claimed in claim 27, wherein said tip surrounding piece has a tip surrounding piece thermal conductivity and said tip has a tip thermal conductivity and said tip surrounding piece thermal conductivity is less than said tip thermal conductivity.

30. A nozzle as claimed in claim 27, further comprising a valve pin system that includes a valve pin and an actuator, wherein said valve pin has a closing surface and is movable through said tip melt channel between a closed position wherein said closing surface is adapted to cooperate with said gate to inhibit melt flow through said gate, and an open position wherein said valve pin is adapted to be spaced from said gate to permit melt flow through said gate, said valve pin has a valve pin alignment surface, said tip has a tip alignment surface positioned in said tip melt channel, and said valve pin alignment surface and said tip alignment surface are adapted to cooperate to align said valve pin with respect to said tip and with respect to said gate, and wherein said actuator is operatively connected to said valve pin.

31. A nozzle as claimed in claim 30, wherein said valve pin alignment surface is separate from said closing surface.

32. A nozzle as claimed in claim 27, wherein said tip has a tip alignment surface that is frusto-conical and said alignment piece has an alignment piece alignment surface that is configured to mate with said tip alignment surface.

33. A nozzle for an injection molding apparatus, said injection molding apparatus including a mold component, said mold component defining at least one mold cavity, said mold component defining a gate into each mold cavity, said nozzle comprising:

a nozzle body, wherein said nozzle body defines a nozzle body melt passage, said nozzle body melt passage is adapted to be in fluid communication with and downstream from a melt source;

a tip that is removably connected to said nozzle body, wherein said tip defines a tip melt passage, said tip melt passage is downstream from and in fluid communication with said nozzle body melt passage, and said tip melt passage is adapted to be upstream from and in fluid communication with said gate;

a tip surrounding piece that is removably connected with respect to said nozzle body; and an alignment piece having upper and lower ends, the lower end being located upstream from a gate, and the alignment piece being positioned between said tip surrounding piece and said tip, wherein said tip surrounding piece retains said tip through said alignment piece.

34. A nozzle as claimed in claim 33, wherein said tip is made from a tip material having a first thermal conductivity, and said tip retaining piece is made from a tip retaining piece material having a second thermal conductivity that is lower than the first thermal conductivity.

35. A nozzle as claimed in claim 33, wherein said tip and said tip surrounding piece are free of contact with one another.

36. A nozzle for an injection molding apparatus, said injection molding apparatus including a mold component, said mold component defining at least one mold cavity, said mold component defining a gate into each mold cavity, said gate defining an axis, said nozzle comprising:

a nozzle body, wherein said nozzle body defines a nozzle body melt passage, said nozzle body melt passage is adapted to be in fluid communication with and downstream from said at least one runner;

a tip that is removably connected with respect to said nozzle body, wherein said tip defines a tip melt passage, said tip melt passage is downstream from and in fluid communication with said nozzle body melt passage, and said tip melt passage is adapted to be upstream from and in fluid communication with said gate, the tip having an upstream end and a downstream end, the tip having at least one upstream alignment surface that cooperates with an alignment surface on another component of the nozzle to align the tip with respect to the nozzle body upstream from said downstream end;

a tip surrounding piece that is removably connected with respect to said nozzle body; and an alignment piece having upper and lower ends, the lower end being located upstream from a gate, and the alignment piece being positioned between said tip and said tip surrounding piece, wherein the alignment piece contacts and aligns the tip downstream from the upstream alignment surface.

37. A nozzle as claimed in claim 36, wherein said tip has a tip thermal conductivity, said alignment piece has an alignment piece thermal conductivity, and said alignment piece thermal conductivity is less than said tip thermal conductivity.

38. A nozzle as claimed in claim 36, wherein said tip surrounding piece has a tip surrounding piece thermal conductivity and said tip has a tip thermal conductivity and said tip surrounding piece thermal conductivity is less than said tip thermal conductivity.

39. A nozzle as claimed in claim 36, further comprising a valve pin system that includes a valve pin and an actuator, wherein said valve pin has a closing surface and is movable through said tip melt channel between a closed position wherein said closing surface is adapted to cooperate with said gate to inhibit melt flow through said gate, and an open position wherein said valve pin is adapted to be spaced from said gate to permit melt flow through said gate, said valve pin has a valve pin alignment surface, said tip has a tip alignment surface positioned in said tip melt channel, and said valve pin alignment surface and said tip alignment surface are adapted to cooperate to align said valve pin with respect to said tip and with respect to said gate, and wherein said actuator is operatively connected to said valve pin.

40. A nozzle as claimed in claim 39, wherein said valve pin alignment surface is separate from said closing surface.

41. A nozzle as claimed in claim 36, wherein said tip has a tip alignment surface that is frusto-conical and said alignment piece has an alignment piece alignment surface that is configured to mate with said tip alignment surface.

42. A nozzle for an injection molding apparatus, said injection molding apparatus including a mold component, said mold component defining at least one mold cavity, said mold component defining a gate into each mold cavity, said gate defining an axis, said nozzle comprising:

a nozzle body, wherein said nozzle body defines a nozzle body melt passage, said nozzle body melt passage is adapted to be in fluid communication with and downstream from said at least one runner;

a tip that is removably connected with respect to said nozzle body, wherein said tip defines a tip melt passage, said tip melt passage is downstream from and in fluid communication with said nozzle body melt passage, and said tip melt passage is adapted to be upstream from and in fluid communication with said gate, the tip having an upstream end and a downstream end, wherein the downstream end of the tip is generally axially close to the gate;

a tip surrounding piece that is removably connected with respect to said nozzle body, the tip surrounding piece having an upstream end and a downstream end, wherein the downstream end of the tip surrounding piece is generally axially close to the gate; and an alignment piece having upper and lower ends, the lower end being located upstream from a gate, and the alignment piece being positioned between said tip and said tip surrounding piece, wherein the alignment piece is proximate the downstream end of at least one of the tip surrounding piece and the tip, to align the tip generally close to the gate.

43. A nozzle as claimed in claim 42, wherein said tip has a tip thermal conductivity, said alignment piece has an alignment piece thermal conductivity, and said alignment piece thermal conductivity is less than said tip thermal conductivity.

44. A nozzle as claimed in claim 42, wherein said tip surrounding piece has a tip surrounding piece thermal conductivity and said tip has a tip thermal conductivity and said tip surrounding piece thermal conductivity is less than said tip thermal conductivity.

45. A nozzle as claimed in claim 42, further comprising a valve pin system that includes a valve pin and an actuator, wherein said valve pin has a closing surface and is movable through said tip melt channel between a closed position wherein said closing surface is adapted to cooperate with said gate to inhibit melt flow through said gate, and an open position wherein said valve pin is adapted to be spaced from said gate to permit melt flow through said gate, said valve pin has a valve pin alignment surface, said tip has a tip alignment surface positioned in said tip melt channel, and said valve pin alignment surface and said tip alignment surface are adapted to cooperate to align said valve pin with respect to said tip and with respect to said gate, and wherein said actuator is operatively connected to said valve pin.

46. A nozzle as claimed in claim 45, wherein said valve pin alignment surface is separate from said closing surface.

47. A nozzle as claimed in claim 42, wherein said tip has a tip alignment surface that is frusto-conical and said alignment piece has an alignment piece alignment surface that is configured to mate with said tip alignment surface.

48. A nozzle for an injection molding apparatus, said injection molding apparatus including a mold component, said mold component defining at least one mold cavity, said mold component defining a gate into each mold cavity, the gate is positioned at the end of a nozzle well in the mold component, said nozzle comprising:

a nozzle body having a threaded portion, wherein said nozzle body defines a nozzle body melt passage, said nozzle body melt passage is adapted to be in fluid communication with and downstream from said at least one runner;

a tip including a threaded portion that is removably connected with respect to said nozzle body through mating of the threaded portions of the nozzle body and the tip, wherein said tip defines a tip melt passage, said tip melt passage is downstream from and in fluid communication with said nozzle body melt passage, and said tip melt passage is adapted to be upstream from and in fluid communication with said gate;

a tip surrounding piece that is removably connected with respect to said nozzle body, the tip surrounding piece is adapted to contact the mold block in the nozzle well to align the tip surrounding piece with respect to the nozzle well; and an alignment piece positioned between said tip and said tip surrounding piece, wherein the alignment piece is aligned by the tip surrounding piece, and wherein the tip is aligned by the alignment piece.

49. A nozzle as claimed in claim 48, wherein said tip has a tip thermal conductivity, said alignment piece has an alignment piece thermal conductivity, and said alignment piece thermal conductivity is less than said tip thermal conductivity.

50. A nozzle as claimed in claim 48, wherein said tip surrounding piece has a tip surrounding piece thermal conductivity and said tip has a tip thermal conductivity and said tip surrounding piece thermal conductivity is less than said tip thermal conductivity.

51. A nozzle as claimed in claim 48, further comprising a valve pin system that includes a valve pin and an actuator, wherein said valve pin has a closing surface and is movable through said tip melt channel between a closed position wherein said closing surface is adapted to cooperate with said gate to inhibit melt flow through said gate, and an open position wherein said valve pin is adapted to be spaced from said gate to permit melt flow through said gate, said valve pin has a valve pin alignment surface, said tip has a tip alignment surface positioned in said tip melt channel, and said valve pin alignment surface and said tip alignment surface are adapted to cooperate to align said valve pin with respect to said tip and with respect to said gate, and wherein said actuator is operatively connected to said valve pin.

52. A nozzle as claimed in claim 51, wherein said valve pin alignment surface is separate from said closing surface.

53. A nozzle as claimed in claim 48, wherein said tip has a tip alignment surface that is frusto-conical and said alignment piece has an alignment piece alignment surface that is configured to mate with said tip alignment surface.

54. An injection molding apparatus, comprising:

a manifold, a mold component and at least one nozzle, wherein said manifold has at least one runner therein and said at least one runner is adapted to be downstream from a melt source, wherein said mold component defines at least one mold cavity said mold component defines a gate into each mold cavity, wherein the gate is positioned at the end of a nozzle well in the mold component, wherein each said nozzle includes a nozzle body, a tip, a tip surrounding piece, and an alignment piece, wherein said nozzle body includes a threaded portion and defines a nozzle body melt passage, and said nozzle body melt passage is in fluid communication with and downstream from one of said at least one runner, wherein said tip is removably connected to said nozzle body, wherein said tip defines a tip melt passage, said tip melt passage is downstream from and in fluid communication with said nozzle body melt passage, and is upstream from and in fluid communication with said gate, wherein said tip surrounding piece includes a threaded portion and is removably connected with respect to said nozzle body through mating of the threaded portions of the nozzle body and the tip surrounding piece, the tip surrounding piece is adapted to contact the mold block in the nozzle well to align the tip surrounding piece with respect to the nozzle well, wherein said alignment piece is positioned between said tip and said tip surrounding piece, and wherein the alignment piece is aligned by the tip surrounding piece, and wherein the tip is aligned by the alignment piece.

55. An injection molding apparatus as claimed in claim 54, wherein said tip has a tip thermal conductivity, said alignment piece has an alignment piece thermal conductivity, and said alignment piece thermal conductivity is less than said tip thermal conductivity.

56. An injection molding apparatus as claimed in claim 54, wherein said tip surrounding piece has a tip surrounding piece thermal conductivity and said tip has a tip thermal conductivity and said tip surrounding piece thermal conductivity is less than said tip thermal conductivity.

57. An injection molding apparatus as claimed in claim 54, further comprising a valve pin system that includes a valve pin and an actuator, wherein said valve pin has a closing surface and is movable through said tip melt channel between a closed position wherein said closing surface is adapted to cooperate with said gate to inhibit melt flow through said gate, and an open position wherein said valve pin is adapted to be spaced from said gate to permit melt flow through said gate, said valve pin has a valve pin alignment surface, said tip has a tip alignment surface positioned in said tip melt channel, and said valve pin alignment surface and said tip alignment surface are adapted to cooperate to align said valve pin with respect to said tip and with respect to said gate, and wherein said actuator is operatively connected to said valve pin.

58. An injection molding apparatus as claimed in claim 57, wherein said valve pin alignment surface is separate from said closing surface.

59. An injection molding apparatus as claimed in claim 54, wherein said tip has a tip alignment surface that is frusto-conical and said alignment piece has an alignment piece alignment surface that is configured to mate with said tip alignment surface.

* * * * *